United States Patent [19]

Ciemochowski

[11] 4,199,039
[45] Apr. 22, 1980

[54] ELECTRONIC SPEED GOVERNOR

[75] Inventor: Michael F. Ciemochowski, Sterling Heights, Mich.

[73] Assignee: Colt Industries Operating Corp., New York, N.Y.

[21] Appl. No.: 882,820

[22] Filed: Mar. 2, 1978

[51] Int. Cl.² ............................................. B60K 31/00
[52] U.S. Cl. ................................. 180/177; 123/102; 123/103 R
[58] Field of Search ............................ 180/108, 105 E; 123/103 R, 102; 251/30, 141; 137/47

[56] References Cited

U.S. PATENT DOCUMENTS

| | | | |
|---|---|---|---|
| 2,961,938 | 11/1960 | Townley et al. | 251/141 X |
| 2,991,053 | 7/1961 | Cramer | 123/103 R X |
| 3,133,531 | 5/1964 | Cramer | 180/108 X |
| 3,249,175 | 5/1966 | Baxter | 123/102 X |
| 3,895,684 | 7/1975 | Takeshi et al. | 180/105 E |

Primary Examiner—Robert R. Song
Assistant Examiner—Milton L. Smith
Attorney, Agent, or Firm—Walter Potoroka, Sr.

[57] ABSTRACT

A vehicle having an engine with a carburetor supplying fuel and having a variably positionable throttle valve, has vacuum responsive motor means operatively connected to the throttle valve for at times closing the throttle valve so as to govern the maximum speed of the engine associated with the vehicle; a variably positionable vent or valving means controls the amount of ambient air being bled into the vacuum responsive motor means in order to thereby determine when such vacuum responsive motor means will be effective to control the position of the throttle valve; and electronic control and actuating means are effective to sense the speed of the engine and actuate the venting or valving means in response to such sensed speed in order to thereby vary the degree of ambient air bleed.

1 Claim, 7 Drawing Figures

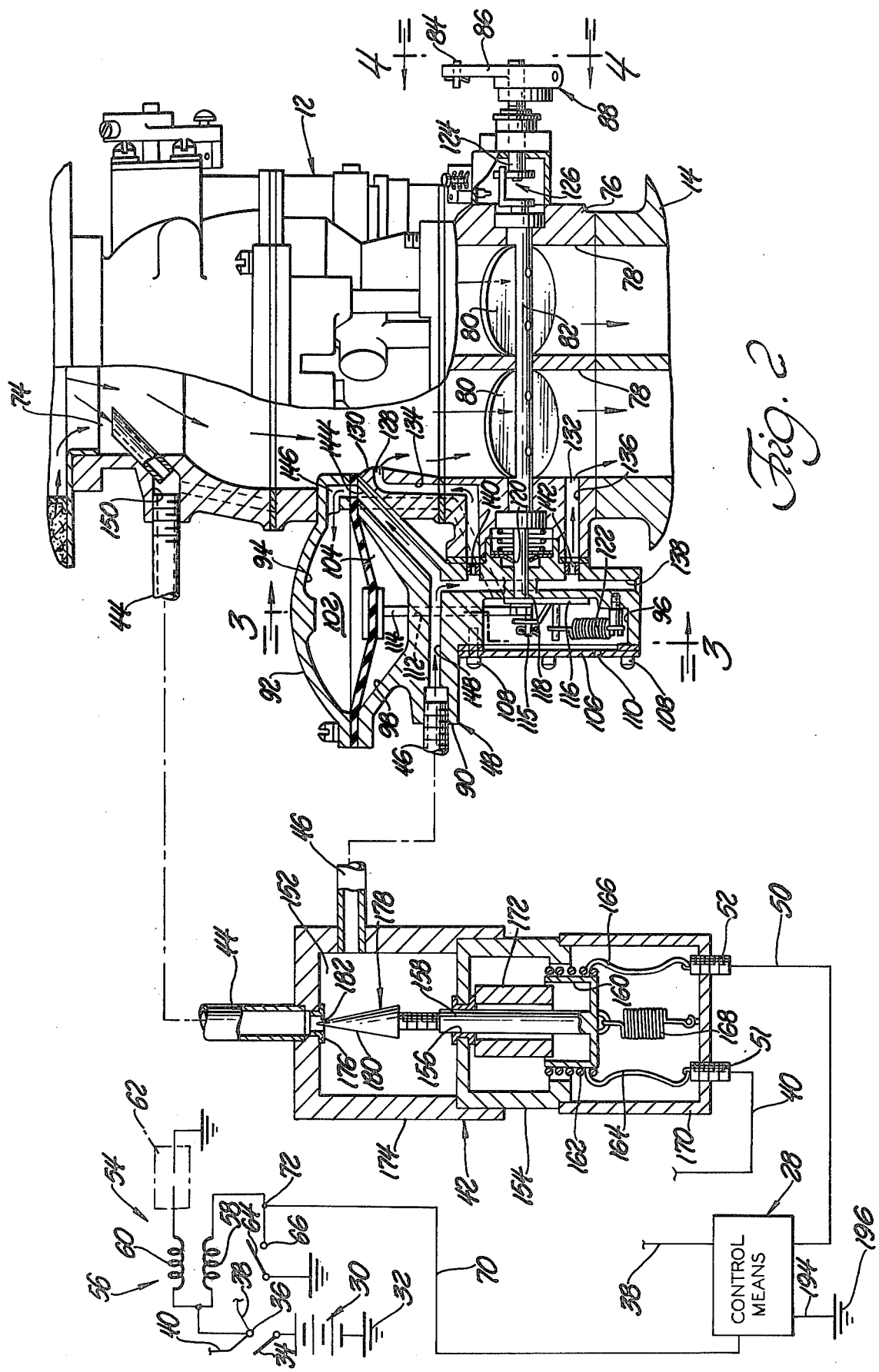

ELECTRONIC SPEED GOVERNOR

BACKGROUND OF THE INVENTION

Heretofore, the prior art has proposed various forms of governing systems for governing the speed of engines and/or engine-driven vehicles. Such usually employed mechanical speed sensitive devices are intended to, for example, be effective for varying the pressure of related pressure responsive motor means for moving engine throttling means to thereby establish a selected governed speed.

However, among other related and attendant problems, the prior art devices, because of their mechanical nature, were found to be difficult to accurately calibrate and establish desired governing characteristics without often resulting in either or both under-sensitivity and over-sensitivity in the overall governing system.

Accordingly, the invention as herein disclosed and described is primarily directed to the solution of such problems of the prior art.

SUMMARY OF THE INVENTION

According to the invention, a governing system for moving related throttle valve means toward a more nearly closed throttle valve position by pressure responsive motor means operatively connected thereto comprises electrically operated variably positionable air bleed valving means, means sensitive to electrical pulses created in response to the speed of a monitored member, means for comparing an electrical signal generated by said electrical pulses to a reference electrical signal indicative of the threshold speed at which governing action is to begin, and additional means effective whenever said generated electrical signal exceeds said reference electrical signal for actuating said electrically operated air bleed valving means to thereby increase the magnitude of a pressure differential in said pressure responsive motor means to initiate actuation of said throttle valve means in the throttle closing direction.

Various general and specific objects and advantages of the invention will become apparent when reference is made to the following detailed description considered in conjunction with the accompanying drawings.

BRIEF DESCRIPTION OF THE DRAWINGS

In the drawings wherein for purposes of clarity certain details and/or elements may be omitted from one or more views:

FIG. 2 is an enlarged view of certain of the elements shown in FIG. 1 with portions thereof being broken away and in cross-section;

DETAILED DESCRIPTION OF THE PREFERRED EMBODIMENT

Figure 1:
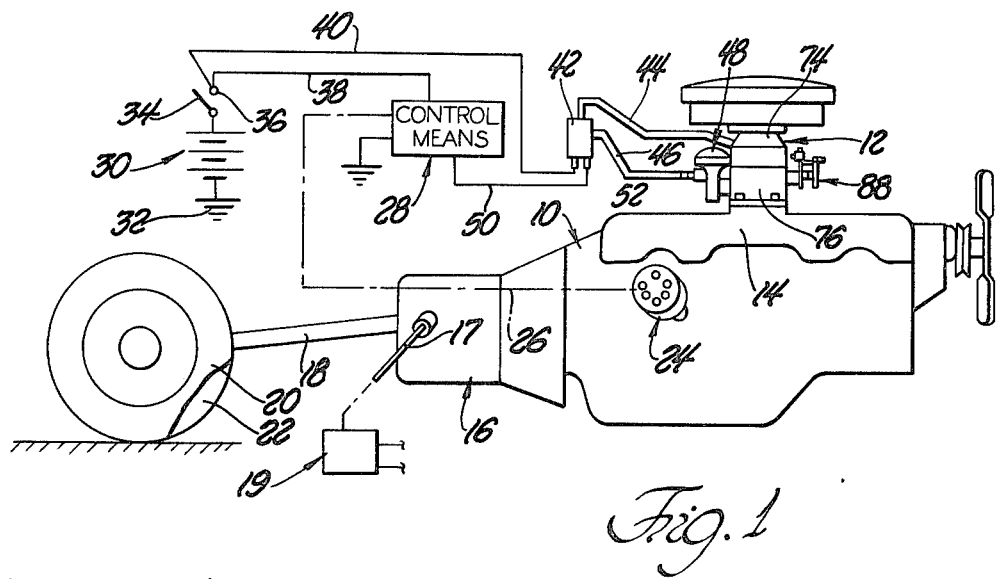
FIG. 1 is a schematic and partly diagrammatic view illustrating a vehicle employing teachings of the invention.

Referring now in greater detail to the drawings, FIG. 1 illustrates, somewhat schematically, a combustion engine 10 which receives a combustible mixture as from a carburetor assembly 12 suitably situated and carried as by the engine intake or inlet manifold 14. A suitable main power transmission assembly 16 is operatively connected to a drive shaft 18 which, in turn, is connected to vehicular ground-engaging drive wheels 20 and 22. An ignition distributor assembly, comprising the ignition system of the engine, is shown at 24 along with electrical transmission means 26 by which an electrical signal, to be described, is transmitted to related electrical logic and control means 28. A suitable course of electrical potential 30, grounded as at 32, is electrically connected as through a related operator key-operated ignition switch 34 to a terminal 36 which, in turn, is electrically connected to conductor means 38 and 40 respectively leading to control means 28 and a force actuator and valving assembly 42. The valving portion of the assembly 42 is generally interposed between conduit portions 44 and 46 with conduit portion 44 leading to a source of generally ambient air while conduit portion 46 leads to a pressure responsive or vacuum motor assembly 48. Conductor means 50 serves to electrically interconnect another terminal 52 of the actuator portion of assembly 42 to the control means 28.

In FIG. 2, the engine ignition system, illustrated in simplified and typical form, is shown at 54 as comprising an ignition coil 56 with a primary winding 58 and secondary winding 60 electrically connected as by conductor means 62, terminal 36, and switch 34 to source of electrical potential 30. As is well-known in the art, the secondary winding 60 discharges sequentially through the rotor of the distributor assembly 24 to a series of engine spark plug assemblies, one of which is depicted at 62. Current flow through the primary winding 58 is interrupted, in timed relationship to engine operation, as by ignition contact means comprised of a movable switch member 64 and fixed contact 66 electrically connected to primary winding 58 as by conductor means 68. As is well-known, usually the switch member 64 and contact 66 generally comprise a portion of the ignition distributor assembly 24 and the switch member 64 is opened and closed as by related rotating cam means also forming a part of the distributor assembly 24. Conductor means 70, electrically connected to conductor means 68, as at 72, serves to transmit electrical signals to the control means 28.

The carburetor 12 is illustrated as comprising an air inlet section 74 and a throttle body section 76 with a pair of induction passages 78 formed therethrough. Each induction passage 78 has a throttle valve 80 therein mounted on a common throttle shaft 82 extending transversely therethrough.

The vehicle operator's foot-operated throttle pedal (not shown) is connected as by throttle linkage means 84 to lever 86 of the throttle operating mechanism 88. Governor motor means 48 is suitably secured to one side of the throttle body 76 in a manner so that the carburetor throttle valves 80 automatically close when the engine 10 reaches its governed speed.

The governor motor means 48 may comprise a body 90 and a cooperating cover 92 which are formed to provide recesses 94, 96 and 98. A pressure responsive movable wall or flexible diaphragm 100 peripherally sealingly retained between body 90 and cover 92 defines, at opposite sides thereof, chambers 102 and 104. A cover plate 106, secured to body 90 as by screws 108, serves to generally close chamber or recess 96 except for an atmospheric vent passage 110 formed in cover plate 106 as to thereby communicate ambient air pressure to recess 96 and to chamber 104 as through the clearance passageway 112 which also freely accommodates a rod member 114 connected at one end to diaphragm 100. The other end 115 of diaphragm rod 114 is pivotally secured to one end of a lever 116 which is, in turn, fixedly secured to one end 118 of journalled throttle shaft 82 which, at such end, projects into recess or chamber 96. A suitable vacuum seal 120 is provided about throttle shaft 82 while a tension spring 122, situated generally within recess 96 and operatively connected to lever 116, serves to resiliently bias the throttle valves toward the open throttle position.

The throttle operating mechanism 88 and lever 86 operatively connected through linkage 84 to the vehicle operator's foot-controlled throttle pedal, not shown, are well-known in the art and need not be described in great detail. However, in general, mechanism 88 cooperates with spring 122, through throttle shaft 82, in a manner as to permit spring 122 to move the throttle shaft 82 and throttle valves 80 toward the open throttle position when the operator's foot throttle pedal is depressed. The usual throttle return spring (not shown but well-known in the art) operatively connected to the throttle actuating means 88 serves to return throttle valves 80 toward the closed throttle position, against the resilient resistance of spring 122 whenever the operator's foot throttle pedal is released and permitted to return to its normal position.

Figure 3:
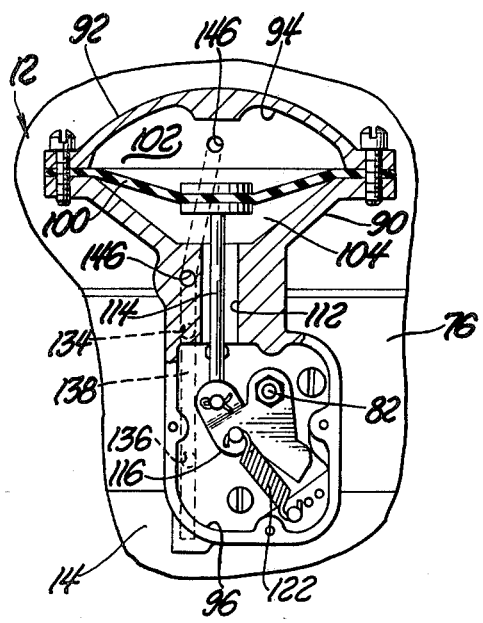
FIG. 3 is a view taken generally on the plane of line 3—3 of FIG. 2 and looking in the direction of the arrows.
Figure 4:
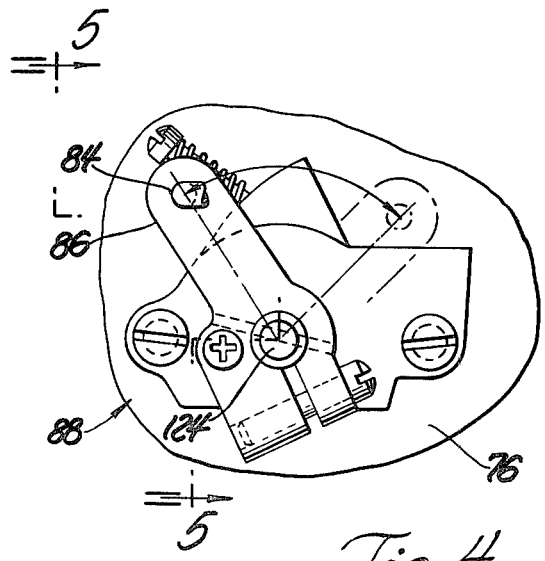
FIG. 4 is a view taken generally on the plane of line 4—4 of FIG. 2 and looking in the direction of the arrows.
Figure 5:
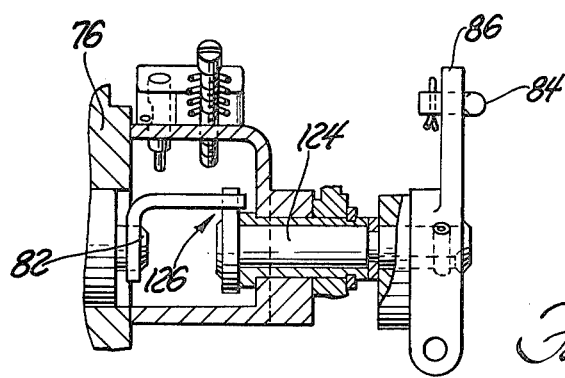
FIG. 5 is a view taken generally on the plane of line 5—5 of FIG. 4 and looking in the direction of the arrows.

From FIGS. 2, 4 and 5, it can be seen that lever 86 is fixedly secured to a stub shaft 124 which operatively connects with throttle shaft 82 through a one-way driving dog arrangement 126. Generally, as can be seen from, for example, FIGS. 2, 3, 4 and 5, as diaphragm 100 is caused to move upwardly, lever 116 rotates in the clockwise direction (as viewed in FIG. 3) thereby similarly rotating throttle shaft 82 and throttle valves 80 toward the closed throttle position while disengaging the driving dog or clutch arrangement 126.

An orifice 128 at the induction passage venturi 130 and an orifice 132 communicating with the induction passage downstream of the throttle valves 80 are interconnected as by passage or conduit means 134, 136 and 138 and calibrated restriction means 140 and 142. Conduit 138 also communicates with a conduit 144 leading to a conduit extension 146 formed in cover 92 and communicating with chamber 102. Further, a conduit 148 formed in body 90 serves to communicate between conduits 138 and 144 at one end and, at its other end, with conduit portion 46 leading to the valving section of actuator assembly 42. As best can be seen in FIG. 2, conduit section 44 has its one end in communication with passage means 150, in carburetor 10, which communicates with a source of generally ambient air as at the air inlet portion 74.

Generally, during periods of engine operation at engine speeds less than governed engine speed, atmospheric air is bled through conduit section 44 into a chamber 152 of assembly 42, through conduits 46 and 148, through conduit 138 and conduits 134 and 136 and respective ports 128, 132 into induction passage means 78. While such air is being freely bled in this manner diaphragm 100 and diaphragm rod 114 will remain in the position depicted and be ineffective for in any way controlling the position of throttle valves 80.

Even though various devices could be employed to practice the teachings of the invention, the assembly 42, in FIG. 2, is illustrated, in simplified form as comprising a first housing 154 with a bearing 156 slidably guiding a stem portion 158 carrying a bobbin portion 160 with an electrical coil 162 carried thereon and having electrical leads 164 and 166 respectively leading to fixed terminals 51 and 52. A tension spring 168 connected at one end to bobbin portion 160 and anchored at its other end to housing section 170 tends to pull stem 158 downwardly (as depicted in FIG. 2). A magnet 172 is suitably secured and carried within housing 154 preferably in a manner permitting stem 158 to freely pass therethrough.

A further housing section 174 forms chamber 152 and has apertures formed therein for the reception of the respective ends of conduits 44 and 46. A valve seat member 176 completes communication between conduit 44 and chamber 152. A valving member 178 operatively carried by stem 158 and preferably axially threadably adjustable relative thereto has a contoured surface 180 which coacts with aperture 182 of valve seat member 176 to define an effective aperture area for bleeding air from conduit 44 into chamber 152. Generally, coil 162, bobbin 160, stem 158 and valve member 178 will move axially a distance generally proportional to the magnitude of current flow through coil 162. The degree of such current flow through coil 162 is, in turn, determined by the control means 28.

Figure 6:
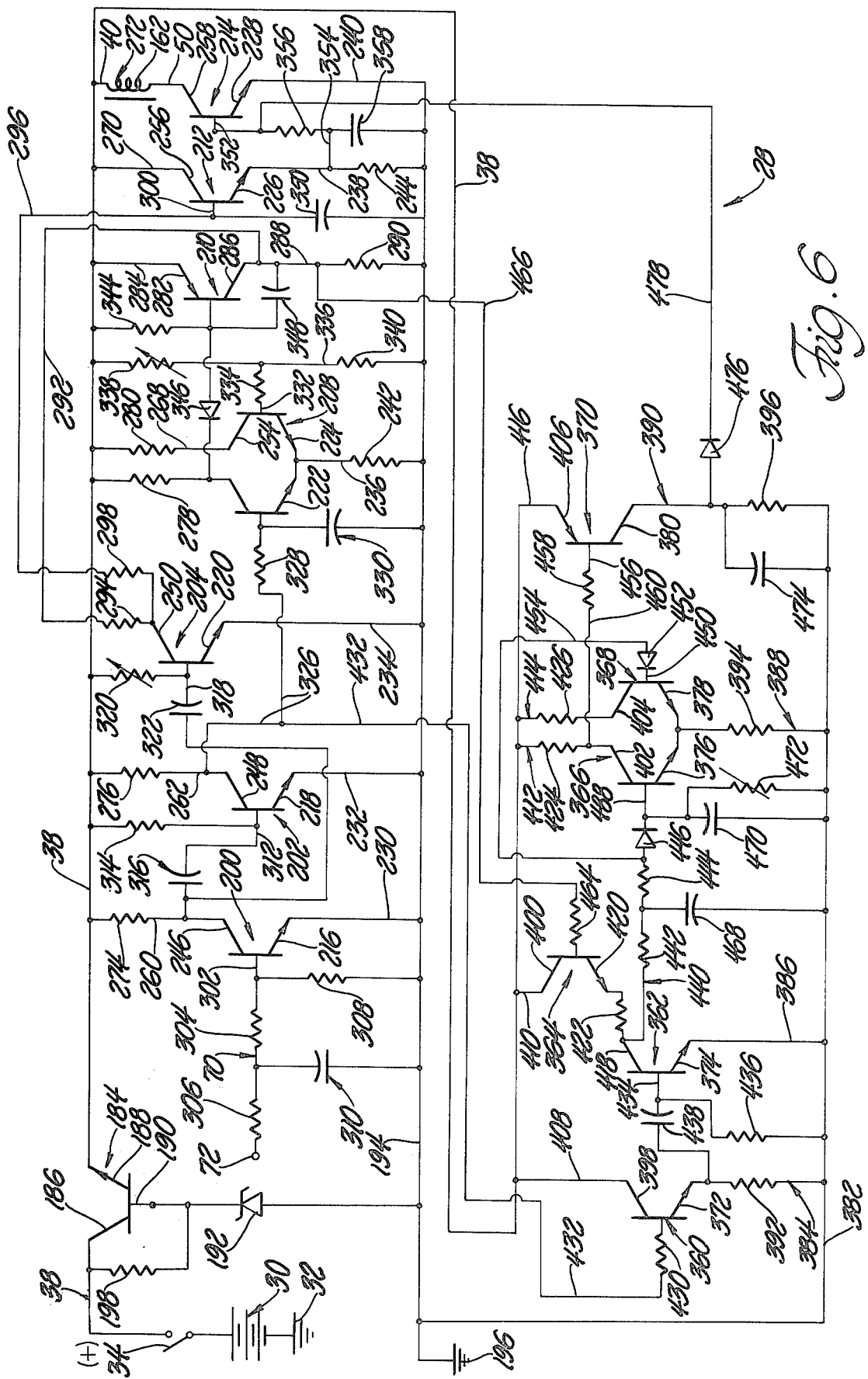
FIG. 6 is a schematic wiring diagram illustrating the circuitry comprising the control means of FIGS. 1 and 2.

FIG. 6 illustrates a preferred embodiment of the control means 28 of FIGS. 1 and 2. Referring in greater detail to FIG. 6, source of electrical potential 30 is shown electrically connected to conductor means 38 in which is situated a transistor 184 in a manner having its collector 186 and emitter 188 in circuit with conductor 38 while its base terminal 190 is connected to a Zener diode 192 having its other side connected to conductor means 194 leading to ground as at 196. A resistor 198 is provided in parallel with the collector 186 base 190 circuit of transistor 184. Additional transistors 200, 202, 204, 206, 208, 210, 212 and 214 are provided. The emitters 216, 218, 220, 222, 224, 226 and 228 of transistors 200, 202, 204, 206, 208, 212 and 214 are respectively electrically connected to ground conductor means 194 as by respective conductor means 230, 232, 234, 236, 238 and 240 with, as shown, conductor means 236 being common to both emitters 224 and 226. Further, conductor means 236 and 238 respectively comprise resistor means 242 and 244. The collectors 246, 248, 252, 254, 256 and 258 of transistors 200, 202, 206, 208, 212 and 214 are respectively connected to conductor means 38 as by conductor means 260, 262, 266, 268, 270 and 272 which, in turn, comprises conductor portions 50 and 40 and coil 162. Further, conductor means 260, 262, 266 and 268 respectively comprise resistor means 274, 276, 278 and 280. It should be noted that transistor 210 has its emitter 282 connected to conductor means 38 via conductor 284 while its collector electrode 286 is connected to ground conductor 194 as by conductor means 288 which comprises resistor means 290. Collector 286 is, in turn, electrically connected to collector 250 of transistor 204 as by conductor means 292 and resistor means 294. Collector terminal 250 is also electrically connected via conductor means 296 and resistor means 298 to base terminal 300 of transistor 212.

The base terminal 302 of transistor 200 is electrically connected through conductor means 70, which comprises resistor means 304 and 306, to juncture 72 which is connected, as shown in FIG. 2, to conductor 68. A resistor 308 has its opposite ends connected to base terminal 302 and to ground conductor means 194. Similarly, a capacitor 310 has one electrical side connected to conductor means 70, as at a point generally between resistors 304 and 306, and ground conductor 194.

Transistor 202 has its base terminal 312 connected to conductor 38 as through a resistor 314 and to conductor means 260, generally between collector 264 and resistor 274, as through capacitor means 316. Similarly, transistor 204 has its base terminal 318 connected to conductor 38 as through a variable resistor or potentiometer 320 and to conductor means 260, also generally between collector 264 and resistor 274, as through capacitor means 322.

Transistor 206 has its base terminal 324 connected as through conductor means 326, comprising resistor means 238, to conductor means 262 as at a point generally between collector 248 and resistor 276. Base 324 is also connected to ground 194 via capacitor means 330. Transistor 208 has its base 332 connected, via resistor means 334, to conductor means 336 comprising a variable resistor or potentiometer 338 and resistor 340 which define a voltage divider across conductor means 38 and 194.

Transistor 210 has its base 342 connected to conductor 38 as through a resistor 344, to conductor 266 as between collector 252 and resistor 278 via diode means 346 and to conductor means 288 as between resistor 290 and collector 286 via capacitor means 348.

Base 300, in addition to being connected to collector 250 of transistor 204, is also connected via capacitor means 350 to ground conductor means 194. Load or power transistor 214 has its base 352 connected via conductor means 354, comprising resistor means 356, to conductor 238 and emitter 226 of transistor 212. A capacitor 358 has its one electrical side connected to conductor 354, as at a point generally between emitter 226 and resistor 356, and its other electrical side connected to ground conductor means 194.

Generally, in a 12 volt vehicular electrical system, every time the ignition contacts open and close, in timed relationship to engine operation, both a positive voltage pulse and a negative voltage pulse are experienced as at point or juncture 72. The positive pulse may be in the order of magnitude of approximately 12 volts while the accompanying negative pulse may be in the order of magnitude of approximately −300 volts. In the invention, such pulses are employed as signals used to, in turn, derive or create a voltage proportional to engine speed. Generally, such developed speed voltage is compared to a reference voltage which is proportional or otherwise reflective of desired governed speed. When a match between such is attained, the actuator 42 starts to close the air being bled through conduit means 44 which, in turn, causes the pressure in chamber 102 to decrease resulting in diaphragm 100 moving upwardly and rotating throttle valves 80 toward a closed throttle position.

Referring in greater detail to FIG. 6, transistor 184 and Zener diode 192 comprise a voltage regulator which, in one successful embodiment of the invention, served to regulate the voltage from a value of 12 volts to a value of 10 volts.

Transistors 200 and 202 comprise a pulse generating circuit which generates a constant width positive pulse at the collector 248 of transistor 202 every time that ignition contact switch member 64 opens.

When the ignition contact switch 64 is closed, transistor 200 is rendered non-conductive while transistor 202 is made conductive thereby bringing collector 248 to generally ground potential of conductor 194. In this state, capacitor 316 charges through resistor 274. The input network connected to the base 302 of transistor 200 comprises a low pass filter which attenuates the initial approximately −300 volt spike and any other high frequencies; however, it does allow the d.c. from the source 30 to be applied to the base 302 of transistor 200. When transistor 200 turns "on", i.e., becomes conductive, its collector 246 goes to ground potential, through conductor 230, and at that instant, capacitor 316 which was previously charged to be positive (+) on the left side thereof and negative (−) on the right side thereof, now presents a negative (−) voltage to the base 312 of transistor 202 which causes transistor 202 to be turned "off", i.e., non-conductive, and resulting in its collector 248 being at the magnitude of the regulated supply voltage of conductor 38. The collector 248 of transistor 202 remains at such supply voltage until capacitor 316 is charged up in the opposite direction due to current flow through resistor 314. When such capacitor 316 becomes sufficiently charged in the opposite direction, transistor 202 again becomes turned "on". In this manner it can be seen that a positive pulse of fixed width is generated at collector 248 of transistor 202 by every opening of the ignition contact switch member 64.

Transistors 206 and 208 comprise differential amplifier means. As can be seen and as previously generally described, base electrode 332 of transistor 208 is connected to the voltage divider comprised of resistors 338 and 340; accordingly, because of the adjustability of resistor 338, the actual voltage at base terminal 332 can be adjusted. Current from transistor 208 flows through the common resistor 242 and raises the voltage at both emitters 222 and 224 of transistors 206 and 208 to approximately the magnitude of the voltage divider. As is shown, collector 248 is connected to base 324 of transistor 206; therefore, every time that transistor 202 is turned "off" thereby causing its collector 248 to be at supply voltage, a current pulse is sent into capacitor 330 which is connected to base 324 of transistor 206. When transistor 202 is again turned "on" and its collector 248 again goes to ground, some of the charge in capacitor 330 is drained out. As the number of pulses per second (pulses from transistor 202) increases, the magnitude of the voltage across the capacitor 330 increases. Accordingly, at some engine speed, the time rate of such pulses from transistor 202 becomes sufficient as to result in the magnitude of the voltage across capacitor 330 becoming equal to the magnitude of the voltage drop across voltage divider resistor 340. When this happens, transistor 206 becomes turned "on," i.e., conductive, thereby lowering the potential of its collector 252 until current can flow out of base terminal 342 of transistor 210 which, in turn, causes transistor 210 to be turned "on" resulting in its collector 286 being at the potential of the regulated supply voltage of conductor 38.

The collector 286 of transistor 210 is also connected via conductor means 292 and resistor 294 to collector 250 of transistor 204. Accordingly, it can be seen that every time transistor 210 is turned "on", collector 250 of transistor 204 is also placed at the potential of the regulated supply voltage of conductor 38. Therefore, transistors 210 and 204 act as a pulse generating means in exactly the same manner as transistors 200 and 202 and, as shown, the positive pulses produced at collector 250 of transistor 204 are applied, via resistor means 298 and conductor means 296 to base electrode 300 of transistor 212.

A capacitor 350 connected to base 300, accumulates current pulses derived from transistor 204. When transistor 204 is "off" current flows into capacitor 350 via resistors 294, 298 and conductors 292, 296 and when transistor 204 is "on" current is taken out of capacitor 350 via resistor 298. As the engine speed increases the ratio of the "on" time to the "off" time of transistor 204 becomes greater and the voltage across capacitor 350 increases.

Transistor 212 is in the emitter follower configuration and because, preferably, resistance 244 is of a relatively high magnitude transistor 212 presents a very high impedance to capacitor 350. Therefore, transistor 212 buffers the capacitor 350 and the capacitor's voltage appears across the emitter's resistance which, in turn, is applied to the base electrode 352 of transistor 214 via resistor 356 and conductor 354. Capacitor 358 acts as a filter to remove any voltage ripples produced by the pulses. As the voltage at the emitter 226 of transistor 212 rises in response to increasing engine speed, transistor 214 increases in its degree of conduction, proportionately.

As can be seen, the coil or winding 162, of the bleed valve actuator 42 assembly of FIG. 2, is in the collector circuit of transistor 214. Accordingly, the more transistor 214 is made to conduct, the greater becomes the current flow through winding 162 and the more is valve member 178 moved toward valve seat aperture 182 thereby more nearly shutting off the air flow or air bleed through conduit means 44. As previously indicated, the reduction of such air bleed results in an increase in the magnitude of the vacuum in chamber 102 ultimately causing diaphragm 100 to move upwardly and rotating throttle valves 80 toward a closed throttle position.

Generally, it can be seen that governing action is started at an engine threshold speed determined by transistors 206 and 208 and that the throttle valves 80 then close in proportion to the engine speed above or exceeding such threshold speed. This, of course, also provides stability to the system and prevents what is commonly referred to as "hunting", that being a condition where, for example, the system is continually first causing the throttle valve means to close too much and then in attempting to correct such over-closing, opens the throttle means too much with such action being continually repeated during the governing phase.

In addition to the circuitry already described, the preferred embodiment of the invention also employs the circuitry described by and associated with transistors 360, 362, 364, 366, 368 and 370. The respective emitters 372, 374, 376 and 378 and collector 380 of transistors 360, 362, 366, 368 and 370 are connected to conductor means 382 and ground conductor 194 as by respective conductor means 384, 386, 388 and 390 with emitters 376 and 378 being connected to the common conductor means 388. Further, as can be seen, conductor means 384, 388 and 390 comprise respective resistor means 392, 394 and 396.

Collectors 398, 400, 402 and 404 and emitter 406 of transistors 360, 364, 366, 368 and 370 are connected to the regulated supply voltage conductor means 38 as by respective conductor means 408, 410, 412, 414 and 416 while collector 418 of transistor 362 is electrically connected to emitter 420 of transistor 364 as through resistor means 422. Further, it can be seen that conductor means 412 and 414 respectively comprise resistor means 424 and 426.

The base electrode 428 of transistor 360 is electrically connected to collector 248 of transistor 202 via resistor means 430, conductor means 432 and conductor means 326. Transistor 362 has its base 434 connected to conductor means 382, through resistor means 436, and to emitter 372, through capacitor means 438. Conductor means 440, comprising resistor means 442 and 444 and diode means 446 serves to electrically connect base terminal 448 of transistor 366 to collector 418 of transistor 362. The base terminal 450 of transistor 368 is electrically connected via diode means 452 and conductor means 454 to conductor means 440 as at a point generally between resistor 444 and diode 446, while base electrode 456 of transistor 370 is connected via resistor means 458 and conductor means 460 to collector 402 of transistor 366. The base electrode 462 of transistor 364 is electrically connected to collector 286 of transistor 210 as by resistor means 464 and conductor means 466.

A capacitor 468 has its one electrical side connected to conductor means 440 as at a point generally between resistors 442 and 444 while its other electrical side is connected to ground conductor 382. A capacitor 470 has its one electrical side connected to ground conductor means 382 while its other electrical side is electrically connected to base terminal 448. A variable resistor or potentiometer 472 is arranged in parallel with capacitor 470. Further, a capacitor 474 has one of its electrical sides connected to conductor means 390, as at a point generally between resistor 396 and emitter 380, and its other electrical side connected to ground conductor means 382 while a diode 476 and conductor means 478 electrically interconnect emitter 380 and conductor 390 to base 352 of transistor 214.

The circuitry described by and associated with transistors 360, 362, 364, 366, 368 and 370 is provided to detect rapid acceleration of engine 10. A rapid acceleration of the engine as possibly in going through lower gear shifting in the transmission 16, might overspeed the engine. To prevent this, the engine acceleration detector circuit portion is preferably provided.

Transistor 360 is a buffer amplifier which receives the positive voltage pulses from the collector 248 of transistor 202 via conductor means 432 and resistor 430. Such positive pulses triggering transistor 360 are, in turn, inverted to negative pulses at the collector 418 of transistor 362. That is, it can be seen that when transistor 360 is turned "on" by the pulse from collector 248, it, in turn, causes transistor 362 to turn "on" thereby bringing collector 418 thereof from a positive (+) value to generally the ground potential of conductor 382 thereby creating a negative (−) pulse at collector 418.

Also, transistor 364 has its base connected to the collector 286 of transistor 210 which is the same transistor which energizes transistor 204. Accordingly, transistor 364 may be considered as a switching means which functions to electrically connect the collector 418 of transistor 362 to the regulated supply voltage of conductor means 38 when the governing threshold engine speed is attained thereby allowing the acceleration detection circuitry to function only at such threshold speed and speeds greater than that.

When transistor 364 is turned "on" and transistor 362 conducting, capacitors 468 and 470 will charge through transistor 364, resistors 422, 442 and 444 and diode 446. Base current is supplied to transistors 366 and 368 through diodes 446 and 452. As long as the engine acceleration rate is below a preselected magnitude, transistor 366 will be maintained in its "off" or non-conducting state while transistor 368 will be turned "on" or to its conducting state.

The negative (−) pulses have the effect of allowing the capacitors 468 and 470 to discharge. That is, when the collector 418 of transistor 362 is brought to ground by transistor 362 turning "on", the capacitor 468 discharges through resistor 442 while capacitor 470 discharges through resistor means 472. However, as the rate of change of negative pulses increases (due to increasing engine speed) capacitor 468 discharges at a rate faster than does capacitor 470, the diode 446 providing isolation of capacitor 470 at this time. When this occurs, transistor 366 will start to conduct while transistor 368 will turn "off" because the base voltage at transistor 366 becomes greater than the base voltage at transistor 368.

With transistor 366 thusly being "on" its collector 402 drops in voltage permitting transistor 370 to turn "on" which, in turn, develops a voltage across the resistor 396 and such voltage is applied via conductor means 478 to the base 352 of power transistor 214 causing it to turn "on" and supply current to the coil or winding 162. The diode 476 prevents transistor 370 emitter, resistor 396 and capacitor 474 from affecting the operation of transistors 212 and 214 during normal operation.

Figure 7:
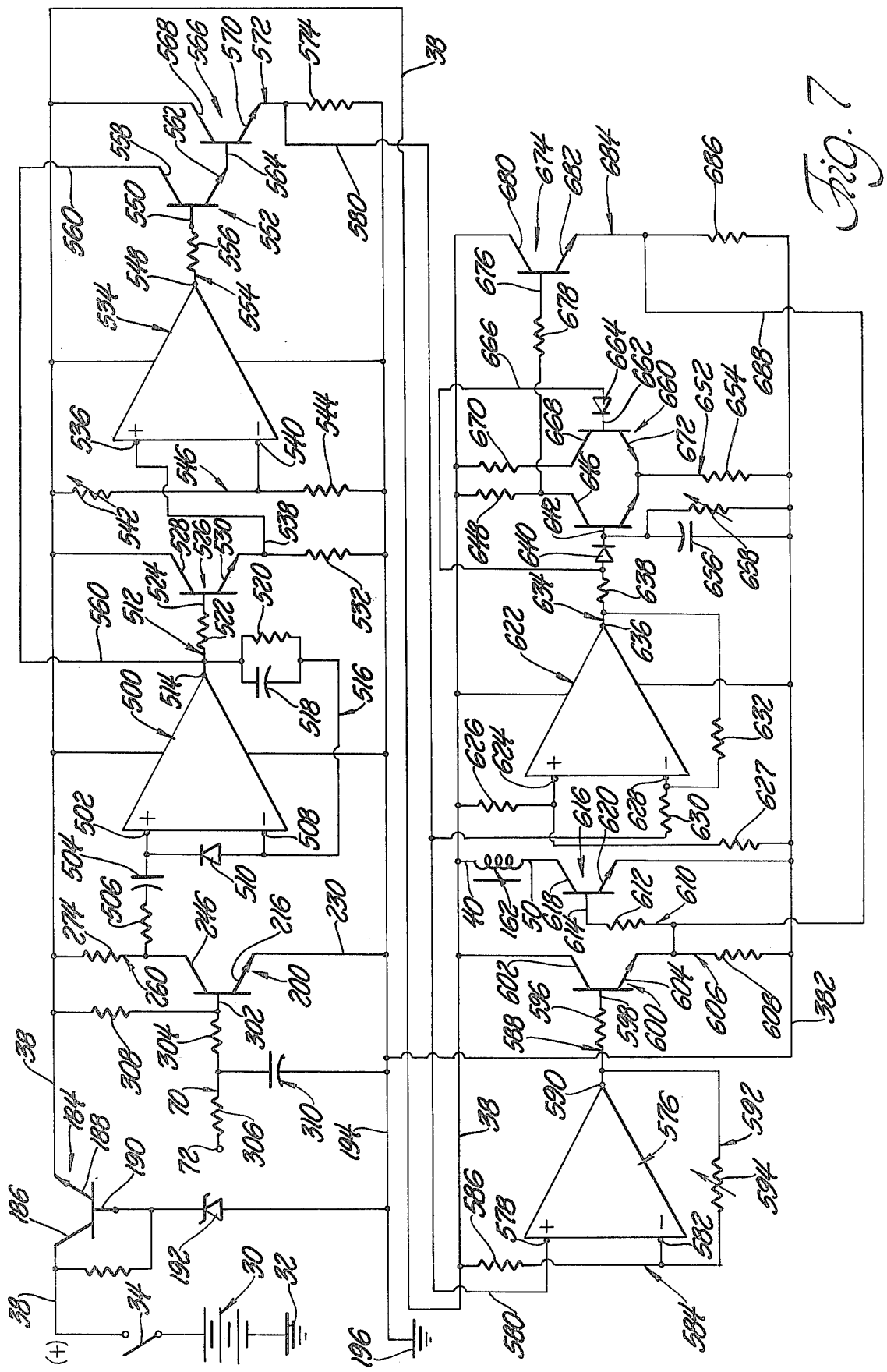
FIG. 7 is a schematic wiring diagram illustrating a modified embodiment of the circuitry comprising the control means of FIGS. 1 and 2.

FIG. 7 illustrates another embodiment of the invention. Some of the elements in FIG. 7 which are like or similar to those of FIG. 6 may be identified with like reference numbers. It can be seen that in FIG. 7 resistor 308 is connected to the regulated supply voltage of conductor 38 instead of to ground as in FIG. 6.

Still referring to FIG. 7, a first operational amplifier 500 has its non-inverting input terminal 502 connected to the collector 246 of transistor 200 by means of series connected capacitor 504 and resistance 506. The inverting input terminal 508 of amplifier 500 is connected to terminal 502, by a diode 510, and to conductor means 512 connected to output terminal 514 of amplifier 500, by conductor means 516 comprising parallel arranged capacitor 518 and resistance 520 means. Conductor means 512 comprises resistance means 522 serially connected to the base electrode 524 of a transistor 526 having its collector 528 connected to conductor 38 and its emitter 530 connected through resistance means 532 to ground conductor 194.

A second comparator amplifier 534 has its non-inverting input terminal 536 connected to emitter 530 via conductor means 538 while its inverting input terminal 540 is electrically connected as to a point generally between variable resistance or potentiometer means 542 and a resistance 544 comprising a voltage divider 546 connected electrically across conductor means 38 and 194. The output terminal 548 of amplifier 534 is electrically connected to base electrode 550 of a transistor 552 as by conductor means 554 comprising series resistor means 556. Transistor 552 has its collector 558 connected to output terminal 514 of amplifier 500 via conductor means 560 while its emitter 562 is connected to a base terminal 564 of a transistor 566 which has its collector 568 connected to regulated supply voltage conductor 38 and its emitter 570 connected to ground conductor 194 as by conductor means 572 comprising resistance means 574.

A third amplifier 576 has its non-inverting input terminal 578 connected, via conductor means 580, to emitter 570 of transistor 566 while its inverting input terminal 582 is connected via conductor means 584 comprising series resistance means 586, to regulated supply voltage conductor 38 and to conductor means 588 connected to amplifier output terminal 590, as by conductor means 592 comprising variable resistance or potentiometer means 594. Conductor means 588 comprises series resistor means 596 connected to the base terminal 598 of a transistor 600 which has its collector 602 connected to regulated supply voltage conductor 38 and its emitter 604 connected via conductor means 606, comprising series resistor means 608, to ground conductor 382. Emitter 604 is also connected by conductor means 610, comprising resistance means 612, to base terminal 614 of a power transistor 616 which has its collector 618 connected to regulated supply voltage conductor 38 through coil 162 (also see FIG. 2) and its emitter 620 connected to ground conductor 382.

A fourth amplifier 622 has its non-inverting input terminal 624 connected to voltage divider means electrically across conductors 38 and 382, comprising resistance means 626 and 627, while its inverting input terminal 628 is connected through resistance means 630 to conductor means 580 and, through resistance means 632 to conductor means 634 connected to the output terminal 636 of amplifier 622. Conductor means 634 comprises series resistance means 638 and diode means 640 connected to base terminal 642 of a transistor 644 which has its collector 646 connected via resistance 648 to conductor 38 and its emitter 650 connected to ground conductor 382 as by conductor means 652 comprising resistance means 654. A capacitor 656 has one electrical side connected to base terminal 642 while its other electrical side is connected to ground conductor 382. A variable resistor or potentiometer 658 is also connected to base 642 in parallel relationship to capacitor 656.

A transistor 660 has its base terminal 662 connected through diode 664 and conductor means 666 to conductor means 634 as at a point generally between resistance 638 and diode 640 while its collector 668 is electrically connected through resistance 670 to conductor 38 and its emitter 672 is connected to conductor means 652 and emitter 650 of transistor 644.

A further transistor 674 has its base terminal 676 connected via resistance means 678 to collector 646 of transistor 644 while its collector 680 is connected to conductor 38 and its emitter 682 is connected to ground conductor 382 as by conductor means 684 comprising resistance means 686. Emitter 682 is also connected to emitter 604 of transistor 600 as by conductor means 688.

Referring to FIGS. 2 and 7, when the ignition contact or breaker switch member 64 is closed, transistor 200 is "off" or non-conducting and collector 246 thereof is at the potential of the regulated supply voltage of conductor 38. At this time current flows into capacitor 504 charging it positive (+) on the left side as viewed in FIG. 7. When ignition breaker switch member 64 opens the base 302 of transistor 200 is connected to the supply voltage via resistors 306 and 304 and therefore turns "on" causing collector 246 to go to ground potential of ground conductor 194. This, in turn, causes capacitor 504 to place the non-inverting terminal 502 of amplifier 500 at a potential below ground and current therefore flows through the feedback network of conductor means 516 and diode 510 resulting in the non-inverting terminal 502 being brought back up to ground potential. When this occurs, current stops flowing in the feedback path and a charge is stored in the feedback capacitor 518, with some portion thereof being bled off by resistor 520.

As the speed of engine 10 increases, the amount of charge stored in the feedback capacitor 518 increases. Therefore, a voltage proportional to engine speed appears at the output terminal 514 of amplifier 500. Transistor 526 is in an emitter follower buffer amplifier configuration with a speed analog voltage appearing at the emitter 530.

Amplifier 534 serves to compare the actual generated speed voltage with a reference voltage proportional or indicative of a predetermined or preselected governed engine speed. Such a reference voltage signal is determined by the voltage divider 546 and applied to the inverting input terminal 540.

When the generated speed voltage is equal to or greater than the reference voltage, the output terminal 548 of amplifier 534 goes to a magnitude of the regulated supply voltage conductor 38; otherwise output terminal 548 is at a potential at or near ground potential.

When the output at terminal 548 becomes relatively high (+), transistors 552 and 566 are turned "on" with transistor 552 serving as a switch to turn "on" transistor 566. It should be noted that collector 558 of transistor 552 is connected to the output 514 of amplifier 500 which is developing the actual speed voltage signal. Therefore, for all practical purposes, the generated speed voltage is applied, via transistor 552, to the base 564 of transistor 566. Accordingly, transistor 566 effectively becomes an emitter follower connected to the generated speed signal and the speed signal will appear at emitter 570 of transistor 566 as soon as the governing threshold speed voltage is reached.

Amplifier 576 is also a voltage follower and its gain is variable by selectively adjusting the magnitude of the resistance 594. This, in turn, establishes the rate at which governing proceeds after the threshold speed has been reached.

Transistor 600 is also a buffering emitter follower and provides the base current to drive or turn "on" power transistor 616 which, in turn, controls the current flow through the coil 162 of assembly 42 (FIG. 2).

Amplifier 622 and transistors 644, 660 and 674 comprise an acceleration sensing circuit. It should be noted that transistors 644, 660 and 674 directly correspond to transistors 366, 368 and 370 of FIG. 6 and function in the manner previously described with regard to FIG. 6, with conductor 688 corresponding to conductor 478 of FIG. 6. Generally, as the generated speed voltage goes positive, the output of amplifier 622 will go negative (−) and if it falls at a rate faster than the time constant determined by capacitor 656 and resistor 654, then transistor 644 will turn "on" energizing transistors 674 and 616 causing the winding 162 to be energized resulting in the throttle valves 80 being moved toward the closed throttle position.

The invention has been disclosed as an engine speed governor; however, it should be apparent that in its total concept and teachings the invention may be employed also as a vehicle speed governor. In its broad sense, terminal 72 is sensitive to an electrical pulse signal generated in response to any moving monitored member. As is well-known in the art as is generally illustrated in FIG. 1, suitable pulse generating means 19 may be driven as by related means 17 operatively connected to the vehicular power train means associated with the vehicular ground engaging drive wheels 20 and 22.

Although only a preferred embodiment and a modification of the invention have been disclosed and described, it is apparent that other embodiments and modifications of the invention are possible within the scope of the appended claims.

I claim:

1. A governor system for a combustion engine having motive fluid induction passage means, comprising variably positionable throttle valve means for controlling the rate of flow of said motive fluid through said induction passage means and into said engine, first means for sensing the speed of monitored moving means associated with said engine and creating a speed signal in response thereto, electrical control means adapted to receive said speed signal and produce in response thereto an electrical output, pressure responsive motor means comprising pressure responsive movable wall means operatively connected to said throttle valve means, means for providing fluid pressure to opposite sides of said movable wall means, and proportional solenoid valving means effective for modulating said fluid pressure to thereby create a pressure differential across said movable wall means, said proportional solenoid valving means being adapted to receive said electrical output and to modulate said fluid pressure in accordance therewith so as to thereby vary the magnitude of said pressure differential in response thereto, said proportional solenoid valving means being effective to increase the magnitude of said pressure differential and thereby cause said wall means to move said throttle valve means toward a more nearly closed position as the speed of said monitored moving means increases and approaches a preselected governed maximum speed, said movable wall means comprising diaphragm means, said means for providing fluid pressure comprises a first source of a first fluid pressure of a generally constant first magnitude and a second source of a second fluid pressure of a second magnitude differing from said first magnitude, said first source of a first fluid pressure comprises ambient atmosphere, said first magnitude comprises generally ambient atmospheric pressure, said second source of a second fluid pressure comprises engine manifold vacuum, said second magnitude varying in response to engine speed and load, said means for providing fluid pressure further comprising first conduit means communicating between said first source and a first area adjacent a first side of said diaphragm means, continuously open second conduit means communicating between said second source and a second area adjacent a second side of said diaphragm opposite to said first side, third conduit means communicating at one end with said second conduit means at a point generally between said second source and said second area and communicating at an opposite end with said first source, said proportional solenoid valving means comprising a valve member situated in series fluid circuit in said third conduit means generally between said second conduit means and said first source, whereby during speeds of said monitored moving means less than said preselected governed maximum speed, said valve member is positioned so as to provide an unrestricted flow from said first source through said third conduit means and said second conduit means to said second source thereby preventing the communication of said second fluid pressure at said second magnitude to said second area, and as said speed of said monitored moving means approaches and equals said preselected governed maximum speed, said valve member is positioned so as to provide a restriction to the flow from said first source through said third conduit means thereby enabling the communication through said second conduit means of at least a substantial portion of said second fluid pressure at said second magnitude from said second source to said second area thereby moving said throttle valve means toward said more nearly closed position.

* * * * *